United States Patent [19]

Guerra et al.

[11] Patent Number: 4,649,324
[45] Date of Patent: Mar. 10, 1987

[54] METHOD AND APPARATUS FOR ADJUSTING CRT GEOMETRY

[75] Inventors: John M. Guerra; William T. Plummer, both of Concord, Mass.

[73] Assignee: Polaroid Corporation, Cambridge, Mass.

[21] Appl. No.: 677,298

[22] Filed: Dec. 3, 1984

[51] Int. Cl.$^4$ .............................................. H01J 29/56
[52] U.S. Cl. ...................................... 315/370; 358/10
[58] Field of Search ................. 315/370; 358/10, 139, 358/163, 69; 324/404; 328/188, 189

[56] References Cited

U.S. PATENT DOCUMENTS

| | | | |
|---|---|---|---|
| 3,440,482 | 4/1969 | Lister et al. | 315/370 |
| 4,106,846 | 8/1978 | Russin | 358/10 |
| 4,316,211 | 2/1982 | Mackey et al. | 358/10 |
| 4,513,318 | 4/1985 | Wilensky et al. | 358/10 |

OTHER PUBLICATIONS

Visual Information Institute, Inc., publication No. 007–1087, pp. 11–12 (1982) by John Harshbarger, entitled "High Technology Television".

*Primary Examiner*—Theodore M. Blum
*Attorney, Agent, or Firm*—John J. Kelleher

[57] ABSTRACT

An improved method and apparatus for rapidly and accurately adjusting CRT image geometry for the purpose of removing defects in an image reproduced by a CRT. The method and apparatus include a conventional pattern generator for producing a grid-like test pattern, in the form of two mutually perpendicular sets of closely spaced parallel lines, on the viewing screen of the CRT whose geometry or image-forming apparatus is to be adjusted. A reference pattern image formed on a transparent base material suitable for viewing by transmitted light and having the same general characteristics as the CRT formed image is supported in superposed relationship with respect to the CRT formed, pattern generator produced test pattern image. Moire pattern bands or fringes indicative of defects in the displayed test pattern and therefore in the CRT geometry viewable by an equipment operator when viewing the displayed test pattern through the transparent reference pattern in such a superposed relationship may be readily removed by adjusting various component parts of the image-forming electron beam deflection system until the moire fringes resulting from image-defect generated misalignment between the CRT formed test pattern image and the transparent material formed reference pattern image are nulled or are no longer visible to an equipment operator.

8 Claims, 11 Drawing Figures

METHOD AND APPARATUS FOR ADJUSTING CRT GEOMETRY

BACKGROUND OF THE INVENTION

The present invention relates to the accurate reproduction of an image by a cathode ray tube (CRT), in general, and to a method and apparatus for readily and accurately making electrical adjustments to a CRT for the purpose of correcting defects in CRT reproduced images, in particular.

As the need for video display hard copy devices grows, so will the need for CRTs with increasingly tight tolerances on geometrical distortions of images reproduced by the CRT. This is particularly true in applications where a hard copy of a relatively complex design or set of mathematical functions displayed on a CRT is subsequently employed to further analyze the design or functions so displayed.

In one type of CRT geometry adjustment system, image size and centering are measured directly at the CRT by means of a template having a set of image-centering cross hairs formed therein that is placed directly on the CRT viewing screen. In a subsequent operation, distortion, linearity and image size at the CRT image plane are measured by employing a pattern generator to display a set of dots in the form of a grid pattern on the CRT viewing screen. The dots forming this type of grid pattern are then compared to a superposed reference target in the form of another set of dots formed on a transparent base material by focusing the viewing screen image onto the plane of the reference target mounted in said film holder. Deviations of the dots in the viewing screen displayed grid pattern from corresponding dots in the reference target are noted and then adjustments are made to correct such deviations and therefore the image defects that such deviations represent. A photograph of the compared grid-pattern images is also taken for further evaluation. This technique has several disadvantages. Among the disadvantages are that it is time-consuming, does not appear to be sensitive enough to measure extremely close linearity and distortion tolerances, requires the use of photographic film, is not comprehensive (separate templates are required for centering and image size correction) and it is not very accurate. In addition, separate image size adjustments must be made at the CRT viewing screen and subsequently at the reference target film plane when adjusting for distortion and linearity.

In another type of CRT geometry adjustment system, a grid of bullseye targets formed on a transparent base material is placed on or near the CRT viewing screen. A dot-type grid pattern is then displayed on the CRT viewing screen from a dot pattern generator. CRT geometry is adjusted by adjusting various component parts of the image-forming electron beam deflection system until every dot generated by the pattern generator falls in the center of its respective bullseye target. The amount by which a dot misses its bullseye is easily measured, and the bullseye rings are calibrated in percent error.

This bullseye technique has the advantage of widespread acceptance in the television industry. Reference targets for use with this technique are available commercially in many forms. The test is accurate, is sensitive enough to measure fairly close tolerances, does not require photographic film and is comprehensive (placing all dots within their respective bullseyes automatically adjusts for the proper degree or amount of distortion, linearity, centering, rotation and image size). However, adjusting CRT geometry by this bullseye technique consumes a relatively large amount of CRT test time in that each individual bullseye must be examined and/or considered for proper CRT adjustment.

A primary object of the present invention, therefore, is to provide a comprehensive method and apparatus for rapidly correcting defects in a CRT-reproduced image.

Another object of the present invention is to provide an improved method and apparatus for correcting defects in a CRT-reproduced image that is both accurate and sensitive to fairly close tolerance image defects.

A further object of the present invention is to provide an improved method and apparatus for correcting defects in a CRT-reproduced image that does not require the photographing of each CRT viewing screen as a part of the CRT adjustment process.

Other objects, features and advantages of the present invention will be readily apparent from the following detailed description of the preferred embodiment thereof, when taken in conjunction with the accompanying drawings.

SUMMARY OF THE INVENTION

In accordance with the present invention, an improved method and apparatus are provided for rapidly and accurately correcting defects in an image reproduced by a CRT. The method and apparatus includes means for generating a test pattern on the viewing screen of the CRT whose image-forming apparatus is to be adjusted. A reference pattern image formed on a base material suitable for viewing by transmitted light and having the same general characteristics as the CRT formed test pattern image is supported in superposed relationship with respect to said CRT formed image. Moire fringes indicative of defects in the displayed test pattern and therefore in the image reproducing capabilities of the CRT and its associated image-forming electron beam drive means, fringes viewable by an equipment operator when viewing the said displayed test pattern through said reference pattern in said superposed relationship, may be readily removed by adjusting various component parts of the image-forming electron beam until the said moire fringes resulting from image-defect generated misalignment between said displayed test pattern image and said superposed reference pattern image are nulled by said equipment operator.

DESCRIPTION OF THE PREFERRED EMBODIMENTS

Figure 1:
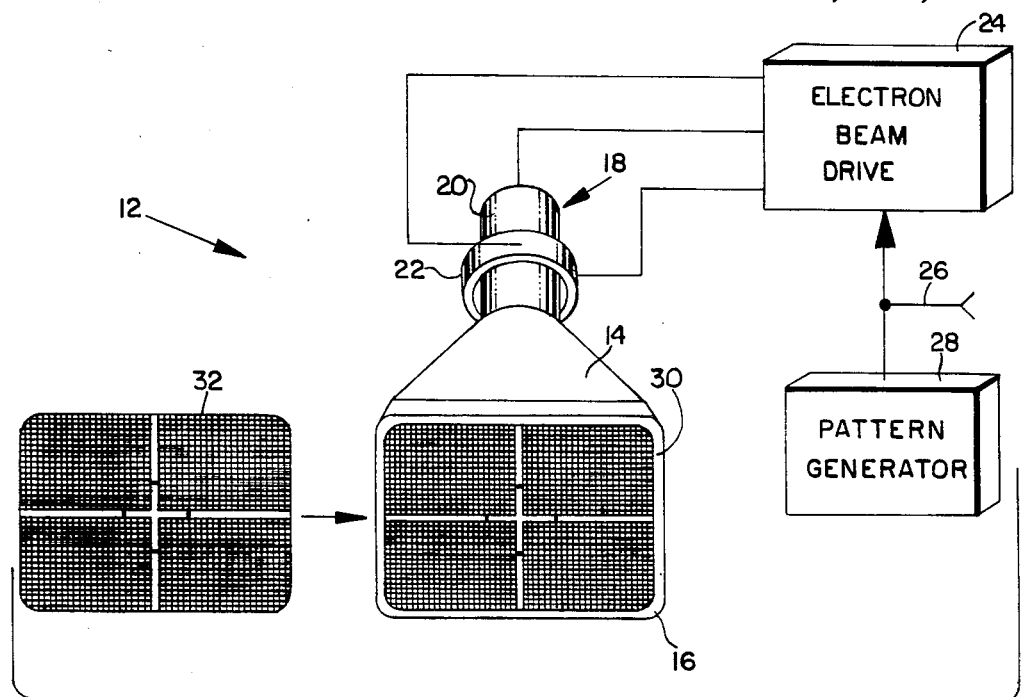
FIG. 1 is a schematic diagram of the major components of the CRT geometry adjustment apparatus of the present invention.

Referring now to the drawings, in FIG. 1 a schematic diagram of the major components of CRT geometry adjustment apparatus 12 of the present invention, is depicted. CRT geometry adjustment appartus 12 includes conventional cathode ray tube (CRT) 14 whose image geometry is to be adjusted, said tube 14 having viewing screen 16 at one end thereof for viewing visual images reproduced by CRT 14. Electron gun 18, positioned within neck 20 of CRT 14 and at the opposite end thereof, generates and controls the image-forming electron beam within said CRT 14. CRT 14 also includes deflection or scanning yoke 22 encircling neck 20 of CRT 14 that produces a magnetic field whose purpose is to deflect the image-forming electron beam generated by electron gun 18 for image forming purposes.

CRT geometry adjustment apparatus 12 also includes electron beam drive 24 whose function is to convert conventional video signals appearing on path 26 into a form that will enable electron gun 18 and deflection yoke 22 to form visible images on CRT viewing screen 16 for viewing by an equipment operator. Electron beam drive 24 includes electron beam adjustment apparatus (not shown) for making changes to or correcting defects in a CRT-reproduced image, corrections or changes preferably made when the CRT is being assembled into a particular product during the manufacturing process.

Conventional pattern generator 28 has its output signal coupled to the input of electron beam drive 24 at the same point that conventional video signal carrying path 26 is coupled to said drive 24 input. Image patterns generated by pattern generator 28 and applied to the video input of electron beam drive 24 are reproduced on viewing screen 16 of CRT 14 in the same manner that images are reproduced on said viewing screen 16 when conventional video signals appearing on path 26 are applied to said drive 24.

Pattern generator 28 generates an ideal grid pattern of horizontal and vertical equally spaced fine lines with the spacing of said grid lines being preferably on the order of 20 lines per inch. Pattern generator 28 also generates a set of mutually perpendicular cross hairs that intersect at the center of said ideal grid pattern with each cross hair being parallel to either the said horizontal or vertical equally spaced lines. Grid pattern 30 shown on viewing screen 16 of CRT 14 is an example of the preferred ideal grid pattern generated by pattern generator 28.

Figure 2:
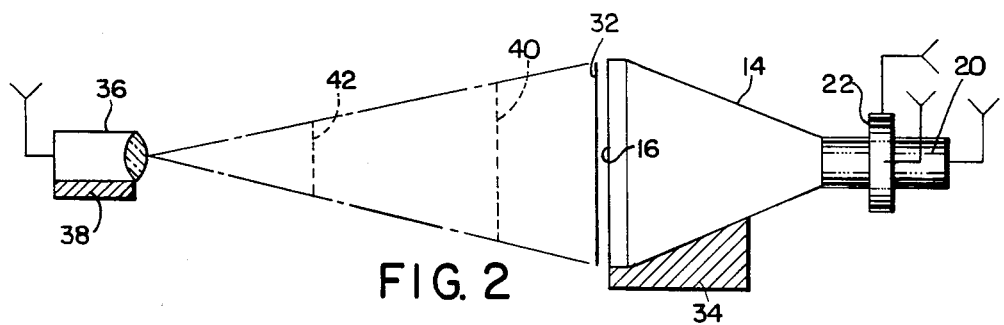
FIG. 2 is a side elevational view of a CRT, a transparent reference pattern image in superposed relationship to an image on the viewing screen of said CRT and an image forming video camera for viewing the image on said CRT screen through said reference image.

In addition to an ideal grid pattern being generated by pattern generator 28, another grid pattern identical to that generated by pattern generator 28 and referred to herein as reference grid pattern 30, is formed on a transparent or clear plastic base material that is suitable for viewing by transmitted light. This reference grid pattern may simply be a transparency-type photograph of, for example, ideal grid pattern 30 perfectly formed on viewing screen 16 of CRT 14 or may be manually drawn directly on such suitable transparent base material by a draftsman or, more elaborately, by a CAD/-CAM type drafting machine. Reference grid pattern 32 shown displaced to the left of CRT 14 in FIG. 1 is formed on a photographic film base and is identical in every respect to ideal grid pattern 30 generated on viewing screen 16 of CRT 14 by pattern generator 28. FIG. 2 illustrates the preferred positional relationship between reference grid pattern 32 and CRT 14 during the CRT 14 geometry adjustment process.

As shown in FIG. 2, CRT 14 is supported in a fixed position by tube support structure 34. Reference grid pattern 32 photographically formed on a transparent film base is positioned adjacent viewing screen 16 of CRT 14 and substantially parallel thereto. Video camera 36 is spaced a predetermined distance from said reference pattern 32 and said CRT viewing screen 16 and is supported in a fixed position at said predetermined distance by camera support structure 38.

The requisite positional relationship between video camera 36, reference grid pattern 32 and ideal grid pattern 30 on viewing screen 16 of CRT 14 is that when an image of ideal grid pattern 30 is accurately reproduced on viewing screen 16 and viewed by video camera 36 connected to a TV monitor (not shown) through transparent reference pattern 32, said reference pattern 32 and said grid pattern 30 on viewing screen 16 of CRT 14 must be in a superposed relationship such that reference pattern 32 and CRT-reproduced grid pattern 30 appear coincident when viewed through said video camera 36. This superposed relationship between grid pattern 30 on viewing screen 16 and transparent reference pattern 32 can be produced by locating said reference pattern 32 adjacent viewing screen 16 as shown in drawing FIG. 2 or by locating said transparent reference pattern 32 in, for example, alternate positions 40 or 42 spaced progressively further from said CRT viewing screen 16. Obviously, the size of transparent reference pattern 32 must be reduced if either alternate positions 40 or 42 is chosen in order to compensate for the change in visual perspective that naturally occurrs when reference pattern 32 is moved closer to video camera 36.

Figure 3:
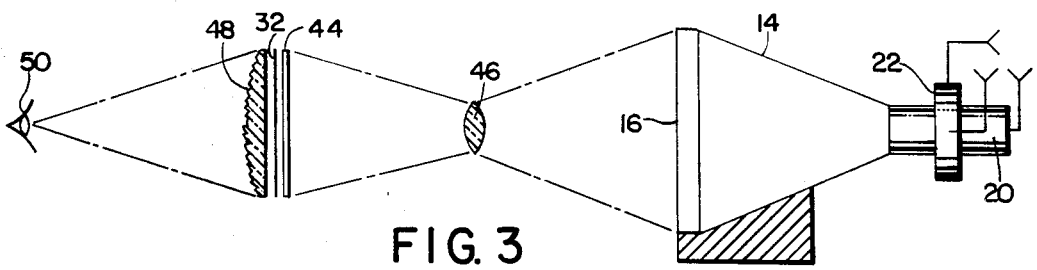
FIG. 3 is the same as that in FIG. 2 except that the CRT viewing screen image is optically focussed onto the plane of the reference image and the said CRT image is directly viewed by an equipment operator.

An alternate, though less-preferable positional relationship between grid pattern 30 on viewing screen 16 and transparent reference pattern 32 is schematically shown in drawing FIG. 3. In FIG. 3, grid pattern 30 (FIG. 1) formed on viewing screen 16 of CRT 14 is optically focused on transparent reference pattern 32 through diffuse viewing screen 44 by lens 46. Fresnel field brightner 48 is positioned adjacent transparent reference pattern 32 to brighten the combined reference pattern and grid pattern images. The requisite fixed positional relationship between ideal grid pattern 30 on viewing screen 16 of CRT 14, transparent referece pattern 32 and lens 46 is that when an image of ideal grid pattern 30 is accurately reproduced on viewing screen 16 and directly viewed by equipment operator 50 through Fresnel field brightner 50, reference pattern 32 and focused grid pattern 30 must be in a superposed relationship or appear to be coincident when viewed by said equipment operator 50. While the arrangement described in this alternate embodiment can be employed to adequately adjust the image geometry of a cathode ray tube, this particular embodiment has some important disadvantages. Among these disadvantages is the inconvenience of the equipment operator having to stand directly in front of the combined reference pattern and focused grid pattern images while adjusting CRT image geometry.

As mentioned above, the CRT image geometry adjustment method and apparatus of the present invention employs moire bands or fringes to determine when CRT image geometry is or is not properly adjusted. Moire fringes are, in general, the resultant combination of any two or more periodic phenomena, whether it is the "beating" that occurs between two sounds close in frequency, the apparent backward rotation of wagon wheels in a western-type motion picture that is the result of the wheel's rotational frequency combining with the frequency in frames per second of film frame movement in a motion picture projector, or the strange criss-cross fringe patterns on overpass highway fences that result from the fact that one of the fences is a little further away and therefore appears to have a smaller grid pattern. In a television viewing screen, moire bands or fringes form the spurious patterns in the reproduced TV image as a result of interference beats between two sets of periodic structures forming a portion of the reproduced image. When moire fringes are displayed in the manner to be described below, thereby indicating maladjustment of CRT image geometry, the goal of the CRT geometry adjustment procedure is to eliminate or null out said visible moire fringes and thereby correct such CRT maladjustment.

Before initiating the CRT geometry adjustment process of the present invention, it is assumed that the cathode ray tube whose geometry is to be adjusted (CRT 14) is properly installed in the device in which it is to be permanently employed, that electron beam drive 24 is energized and that said electron beam drive 24 is capable of generating and controlling the image-forming electron beam produced within CRT 14 over a range of acceptable and unacceptable CRT image geometries. The actual CRT image geometry adjustment process will now be described in detail.

As shown in FIG. 1 of the drawings, ideal grid pattern 30 consisting of relatively fine vertical and horizontal parallel lines, mutually perpendicular to one another are displayed on viewing screen 16 by conventional pattern generator 28. Other grid pattern generating means, such as a digital computer, may also be employed for grid pattern generation purposes. Transparent reference pattern 32 is positioned immediately adjacent viewing screen 16 of CRT 14 and said grid pattern 30 is viewed through said reference pattern 32 by video camera 36 and subsequently displayed on a TV monitor connected thereto (not shown) for convenient viewing by an equipment operator, as schematically shown in drawing FIG. 2.

Figure 4:
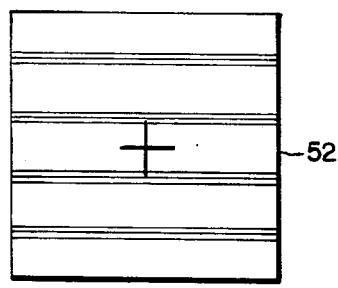
FIG. 4 is an idealized schematic diagram of a set of equally spaced horizontal moire fringes indicating maladjustment of vertical image size.

If the vertical size of ideal grid pattern 30 displayed on viewing screen 16 of CRT 14 is either too large or too small, a plurality of equally spaced, horizontal moire bands or fringes will be displayed on viewing screen 52 of the TV monitor (not shown) connected to video camera 36 as shown in drawing FIG. 4. These horizontal moire fringes indicative of incorrect CRT 14 vertical image size are eliminated and the correct image size concurrently established by adjusting the gain control (not shown) of the vertical size amplifier (normally in the form of an adjustable potentiometer) that forms a part of electron beam drive 24 (FIG. 1) until said horizontal fringes are nulled or are no longer visible on said viewing screen 52 to thereby establish the correct vertical image size.

Figure 5:
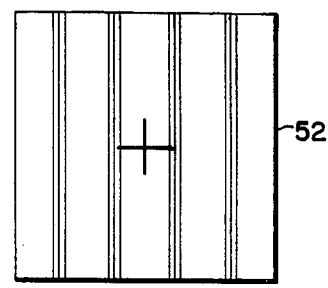
FIG. 5 is an idealized schematic diagram of a set of equally spaced vertical moire fringes indicating maladjustment of horizontal image size.

Similarly, if the horizontal size of ideal grid pattern 30 displayed on viewing screen 16 of CRT 14 is either too large or too small, a plurality of equally spaced vertical moire fringes will be displayed on said viewing screen 52 as shown in drawing FIG. 5. The correct horizontal size of said image 30 is established by adjusting the gain control (not shown) of the horizontal size amplifier (also normally in the form of an adjustable potentiometer) that forms a part of electron beam drive 24 until the said vertical fringes are nulled or are no longer visible on said viewing screen 52 to thereby establish the correct horizontal image size.

Figure 6:
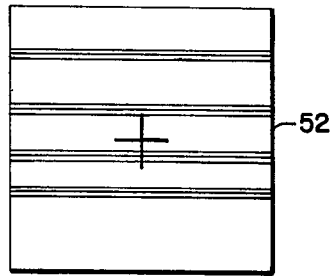
FIG. 6 is an idealized schematic diagram of a set of unequally spaced horizontal moire fringes indicating maladjustment of vertical image linearity.
Figure 7:
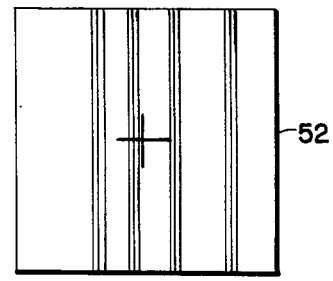
FIG. 7 is an idealized schematic diagram of a set of unequally spaced vertical moire fringes indicating maladjustement of horizontal image linearity.

CRT 14 image linearity is corrected in a manner similar to that employed above to correct vertical and horizontal image size. In FIG. 6, a plurality of unequally spaced horizontal moire fringes displayed on viewing screen 52 of the TV monitor connected to video camera 36 is schematically shown in drawing FIG. 6 and a plurality of unequally spaced vertical moire fringes displayed on said viewing screen 52 indicative of incorrect CRT 14 horizontal linearity is schematically shown in drawing FIG. 7. Incorrect vertical and horizontal image linearity are eliminated and correct vertical and horizontal linearity concurrently established by adjusting the gain controls (not shown) effecting vertical and horizontal linearity (normally an adjustable potentiometer) that form a part of electron beam drive 24 (FIG. 1).

Figure 8:
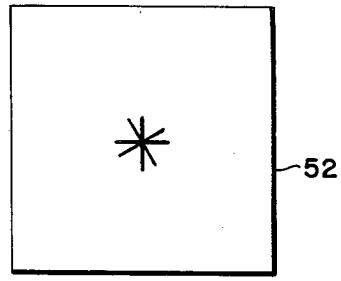
FIG. 8 is a schematic diagram of a set of centered test pattern image and reference pattern image cross hairs indicating maladjustment of the rotational position of the CRT reproduced test pattern image.
Figure 9:
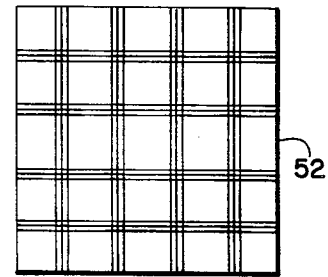
FIG. 9 is an idealized schematic diagram of a moire fringe pattern that, like the cross hairs shown in FIG. 8, also indicates maladjustment of the rotational position of the CRT reproduced test pattern image.

The correct rotational position of ideal grid pattern 30 displayed on CRT viewing screen 16 can be established by employing either of the displays shown in drawing FIGS. 8 or 9. The displays shown in FIGS. 8 and 9 are normally included in a single video display and are simultaneously formed on TV monitor viewing screen 52. However, in order to facilitate describing the present CRT image geometry adjustment process, these displays have been artificially shown in two different figures (FIGS. 8 and 9) as if they occurred at substantially different times.

In one arrangement employing the display of drawing FIG. 8, two sets of cross hairs are shown superimposed on one another. One set of cross hairs is formed by ideal image 30 reproduced on CRT viewing screen 16 (FIG. 1) whereas the other set of cross hairs is formed by transparent reference image 32 (FIG. 2) mounted in a fixed position adjacent said viewing screen 16. The correct rotational position of ideal image 30 occurs when the two sets of cross hairs are coincident or are aligned with each other so as to appear to form a single set of cross hairs as viewed by video camera 36 and as displayed on TV monitor viewing screen 52. To achieve this coincident cross hair alignment, deflection yoke 22 (FIG. 1) is manually rotated about neck 20 of CRT 14 until such cross hair alignment is achieved.

In the other rotational position establishing arrangement employing the display in drawing FIG. 9, a moire fringe pattern consisting of a plurality of spaced-apart vertical and horizontal moire fringes generally parallel to one another formed by the rotational misalignment between ideal image 30 and reference image 32 is displayed on TV monitor viewing screen 52. This particular moire fringe pattern indicates that ideal image 30 displayed on CRT viewing screen 16 is out of rotational alignment with reference image 32. This rotational misalignment is also corrected by manually rotating yoke 22 (FIG. 1) about neck 20 of CRT 14 until the combination vertical and horizontal moire fringe pattern displayed on TV monitor viewing screen 52 is nulled or is no longer visible to an equipment operator.

Figure 10:
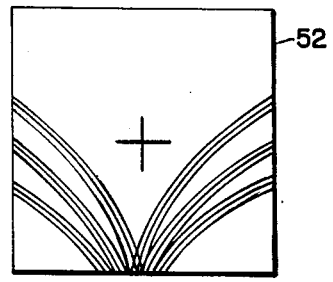
FIG. 10 is an idealized schematic diagram of a moire fringe pattern indicating a form of pin cushion distortion/in the CRT reproduced test pattern image.
Figure 11:
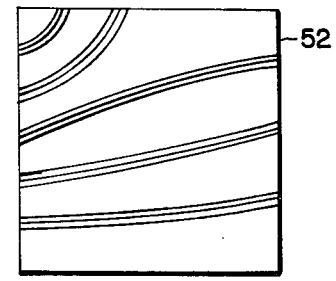
FIG. 11 is an idealized schematic diagram of a moire fringe pattern similar to that in FIG. 4 indicating another more typical type of CRT image distortion.

A moire fringe pattern indicative of one type of pincushion-like distortion in CRT 14 is shown on TV monitor viewing screen 52 and is schematically illustrated in drawing FIG. 10. The moire fringes shown on viewing screen 52 in FIG. 10 resulting from such pincushion-like distortion are "seen" by video camera 36 (FIG. 1) when ideal grid pattern 30 is viewed by said camera 36 through transparent reference image 32 as shown in drawing FIG. 2. Pincushion distortion of the type shown in FIG. 10 is corrected by adhesively attaching one or more permanent magnets to the outer surface of the bell-shaped housing portion of CRT 14 in the vicinity of such distortion until the moire fringes appearing on viewing screen 52 have been nulled by such magnet placement. A more typical distortion of CRT images reproduced by CRT 14 is shown in drawing FIG. 11 and such distortions are corrected by permanent magnet placement in the same manner as that for the pincushion-like image distortion shown in drawing FIG. 10.

Images reproduced by CRT 14 may be correctly centered by adjusting one or more image-position controlling potentiometers (not shown) in electron beam drive 24 until the cross hair sets formed by ideal grid pattern 30 on CRT viewing screen 16 and superposed transparent reference image 32 (FIG. 2) shown in any of the viewing screen 52 FIGS. 4–8, 10 or 11 are aligned or appear coincident with one another.

The CRT image geometry adjustment apparatus of the present invention described above can readily be employed to rapidly and accurately correct image geometry defects in the image reproduced by a cathode ray tube. The method and apparatus is comprehensive, is capable of correcting fairly close tolerance defects, and does not require that photographs be taken of the viewing screen for each CRT whose image geometry is to be adjusted.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. Apparatus for correcting geometric defects in images produced by a CRT system, the CRT system including a viewing screen, means for generating an electron beam directed onto the viewing screen, means for driving the electron beam so as to sweep the viewing screen both vertically and horizontally in a repetitive and fixed manner, means for selectively tuning the drive means to alter the fixed manner in which it causes the electron beam to repetitively sweep the viewing screen, and means for modulating the electron beam as it repetitively sweeps the viewing screen to generate images on the viewing screen, said apparatus comprising:

a reference pattern image adaptable for viewing by transmitted light;

means for supporting said reference pattern image in superposed relationship with respect to the viewing screen of the CRT system; and pattern generating means for controlling the CRT modulating means to cause the electron beam to form a test pattern on the viewing screen having the same general character as said reference pattern image, whereby said reference pattern image and the test pattern formed on the viewing screen, when viewed in superposed relationship by an operator, will present viewable moire patterns indicative of any geometric defects present in the test pattern as caused by maladjustments within the drive means, which maladjustments may then be corrected by manipulation of the tuning means to eliminate the initially viewable moire patterns.

2. A method for correcting geometric defects in images produced by a CRT system, the CRT system including a viewing screen, means for generating an electron beam directed onto the viewing screen, means for driving the electron beam so as to sweep the viewing screen both vertically and horizontally in a repetitive and fixed manner, means for selectively tuning the drive means to alter the fixed manner in which it causes the electron beam to repetitively sweep the viewing screen, and means for modulating the electron beam as it repetitively sweeps the viewing screen to generate images on the viewing screen, said method comprising the steps of:

establishing a reference pattern image adaptable for viewing by transmitted light;

supporting said reference pattern image in superposed relationship with respect to the viewing screen of the CRT system;

controlling the CRT modulating means with pattern generating means to cause the electron beam to form a test pattern on the viewing screen having the same general character as said reference pattern image, whereby said reference pattern image and the test pattern formed on the viewing screen, when viewed in superposed relationship by an operator, will present viewable moire patterns indicative of any defects present in the test pattern as caused by maladjustments within the drive means; and manipulating the tuning means to eliminate the initially viewable moire patterns and the said drive means maladjustments corresponding thereto.

3. Apparatus for correcting pincushion-like distortion in images produced by a CRT system, the CRT system including a CRT housing, a viewing screen, means for generating an electron beam directed onto the viewing screen, means including a magnetic field for driving the electron beam so as to sweep the viewing screen both vertically and horizontally in a repetitive and fixed manner, and means for modulating the electron beam as it repetitively sweeps the viewing screen to generate images on the viewing screen, said apparatus comprising:

a reference pattern image adaptable for viewing by transmitted light;

means for supporting said reference pattern image in superposed relationship with respect to the viewing screen of the CRT system; and pattern generating means for controlling the CRT modulating means to cause the electron beam to form a test pattern on the viewing screen having the same general character as said reference pattern image, whereby said reference pattern image and the test pattern formed on the viewing screen, when viewed in superposed relationship by an operator, will present viewable moire patterns indicative of pincushion-like distortion in the test pattern image caused by a distorted magnetic field produced by the drive means, which distortion may then be corrected by attaching a permanent magnet to the outer surface of said CRT housing in the vicinity of said distortion to thereby eliminate the initially viewable moire patterns and the said pincushion-like distortion related thereto.

4. A method for correcting pincushion-like distortion in images produced by a CRT system, the CRT system including a CRT housing, a viewing screen, means for generating an electron beam directed onto the viewing screen, means including a magnetic field for driving the electron beam so as to sweep the viewing screen both vertically and horizontally in a repetitive and fixed manner, and means for modulating the electron beam as it repetitively sweeps the viewing screen to generate images on the viewing screen, said method comprising the steps of:

establishing a reference pattern image adaptable for viewing by transmitted light;

supporting said reference pattern image in superposed relationship with respect to the viewing screen of the CRT system;

controlling the CRT modulating means with pattern generating means to cause the electron beam to form a test pattern on the viewing screen having the same general character as said reference pattern image, whereby said reference pattern image and the test pattern formed on the viewing screen, when viewed in superposed relationship by an operator, will present viewable moire patterns indicative of pincushion-like distortion in the test pattern caused by a distorted magnetic field produced by the drive means; and attaching a permanent magnet to the outer surface of said CRT housing in the vicinity of said distortion to thereby eliminate the initially viewable moire patterns and the said pincushion-like distortion related thereto.

5. Apparatus for correcting geometric defects in an image reproduced by a CRT, comprising:

a CRT having an image-forming electron beam and having a viewing screen for viewing images reproduced by said CRT;

means coupled to said CRT for making specific adjustments to said electron beam for the purpose of altering the characteristics of an image reproduced by said CRT;

a reference pattern image fixed on a clear base material adaptable for viewing by transmitted light;

means for supporting said reference pattern image in a predetermined position with respect to said image-viewing CRT surface;

means coupled to said CRT for generating a pattern image having the same shape as said reference image and being viewable on said CRT viewing screen; and means for viewing said reference pattern image and the CRT pattern generated by said pattern generating means in superposed relation whereby geometric-defect indicating moire patterns produced by misalignment between said reference pattern image and said CRT pattern image may be nulled and the related image-defects corrected by the adjustment of said image characteristic altering adjustment means.

6. A method for correcting geometric defects in an image reproduced by a CRT, comprising the step of:

providing a CRT having an image-forming electron beam and having a viewing screen for viewing images reproduced by said CRT;

providing means for making specific adjustments to said electron beam for the purpose of altering the geometric characteristics of an image reproduced by said CRT;

forming a reference pattern image on a clear base material adaptable for viewing by transmitted light;

supporting said pattern image in a predetermined position with respect to said CRT viewing screen;

generating a CRT pattern image having the same shape as said reference image that is viewable on said CRT viewing screen;

viewing said CRT pattern image through said reference pattern image in a superposed relationship; and nulling any geometric-defect indicating moire-patterns produced by misalignment between said reference image and said CRT pattern image by suitably adjusting said electron beam image-altering adjustment means and thereby correct CRT geometric image defects related thereto.

7. The apparatus of claim 1, 3 or 5 wherein viewing of the CRT reproduced image through the superposed reference pattern image is carried out with a video camera and a TV monitor electrically coupled thereto.

8. The apparatus of claim 1, 3 or 5 wherein said reference pattern image is formed on a clear plastic base by a photographic process.

* * * * *